United States Patent
Moriya et al.

(10) Patent No.: US 9,020,303 B2
(45) Date of Patent: Apr. 28, 2015

(54) IMAGE MAGNIFICATION DEVICE AND METHOD

(75) Inventors: Shotaro Moriya, Tokyo (JP); Satoshi Yamanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 152 days.

(21) Appl. No.: 13/983,523

(22) PCT Filed: Oct. 7, 2011

(86) PCT No.: PCT/JP2011/073222
§ 371 (c)(1),
(2), (4) Date: Aug. 2, 2013

(87) PCT Pub. No.: WO2012/114574
PCT Pub. Date: Aug. 30, 2012

(65) Prior Publication Data
US 2013/0315506 A1      Nov. 28, 2013

(30) Foreign Application Priority Data

Feb. 21, 2011   (JP) ................. 2011-034294

(51) Int. Cl.
*G06K 9/32* (2006.01)
*G06T 3/40* (2006.01)
*H04N 1/393* (2006.01)
*H04N 1/409* (2006.01)

(52) U.S. Cl.
CPC ............ *G06T 3/4007* (2013.01); *H04N 1/3935* (2013.01); *H04N 1/4092* (2013.01)

(58) Field of Classification Search
None
See application file for complete search history.

(56) References Cited

U.S. PATENT DOCUMENTS

| | | | |
|---|---|---|---|
| 5,754,710 A | 5/1998 | Sekine et al. | |
| 6,882,364 B1 | 4/2005 | Inuiya et al. | |
| 2002/0076121 A1 | 6/2002 | Shimizu et al. | |
| 2002/0126900 A1* | 9/2002 | Kim ............................. | 382/199 |
| 2005/0058361 A1 | 3/2005 | Tajima | |
| 2005/0058371 A1* | 3/2005 | Huang et al. .................. | 382/300 |
| 2005/0074186 A1* | 4/2005 | Lu et al. ........................ | 382/299 |
| 2005/0094899 A1* | 5/2005 | Kim et al. ..................... | 382/300 |
| 2009/0028465 A1* | 1/2009 | Pan ............................... | 382/300 |
| 2009/0238488 A1* | 9/2009 | Joon-Ki et al. ............... | 382/264 |
| 2010/0080488 A1* | 4/2010 | Zhang et al. .................. | 382/269 |
| 2010/0119176 A1* | 5/2010 | Ichihashi et al. ............. | 382/300 |

(Continued)

FOREIGN PATENT DOCUMENTS

| | | |
|---|---|---|
| EP | 1 067 774 A2 | 1/2001 |
| EP | 2 182 484 A1 | 5/2010 |

(Continued)

*Primary Examiner* — Li Liu
(74) *Attorney, Agent, or Firm* — Birch, Stewart, Kolasch & Birch, LLP

(57) ABSTRACT

An interpolation computation unit (3B) treats, as positions of interest, positions where pixels within a high-resolution image (D30) occupy when the high-resolution image (D30) is superimposed on a low-resolution image (D01), and for each position of interest, obtains a pixel value for a pixel assumed to exist at the position of interest by performing an interpolation computation using pixel values of a plurality of pixels within the low-resolution image (D01). An interpolation coefficient calculation unit (3A) obtains interpolation coefficients (D3A) having values that increase with increasing strength of correlation of the pixels in the plurality of pixels in the low-resolution image with the pixel of interest, and outputs the interpolation coefficients to the interpolation computation unit (3B). Angles of edges and shapes of edges are not classified into any predetermined patterns; therefore, it is possible to perform suitable interpolation computations regardless of edge shape.

10 Claims, 8 Drawing Sheets

(56) References Cited

U.S. PATENT DOCUMENTS

| | | | |
|---|---|---|---|
| 2011/0085742 A1* | 4/2011 | Maurer | 382/260 |
| 2011/0115934 A1* | 5/2011 | Wang | 348/222.1 |

FOREIGN PATENT DOCUMENTS

| JP | 7-50752 A | 2/1995 |
|---|---|---|
| JP | 7-107273 A | 4/1995 |
| JP | 8-274983 A | 10/1996 |
| JP | 2000-184386 A | 6/2000 |
| JP | 2001-8037 A | 1/2001 |
| JP | 2002-24815 A | 1/2002 |
| JP | 2005-94119 A | 4/2005 |
| JP | 2005-94120 A | 4/2005 |
| JP | 2008-123156 A | 5/2008 |
| JP | 2009-59011 A | 3/2009 |

* cited by examiner

FIG.7(A)    FIG.7(B)    FIG.7(C)
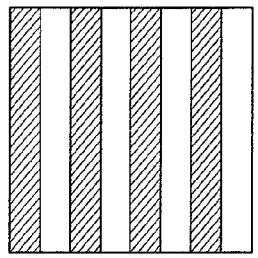 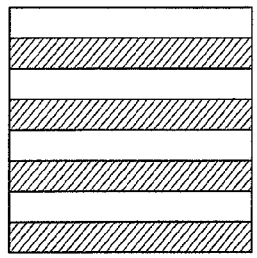 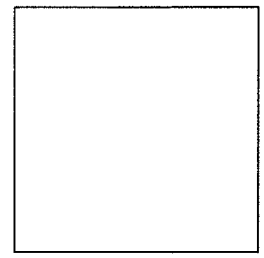
FIG.8
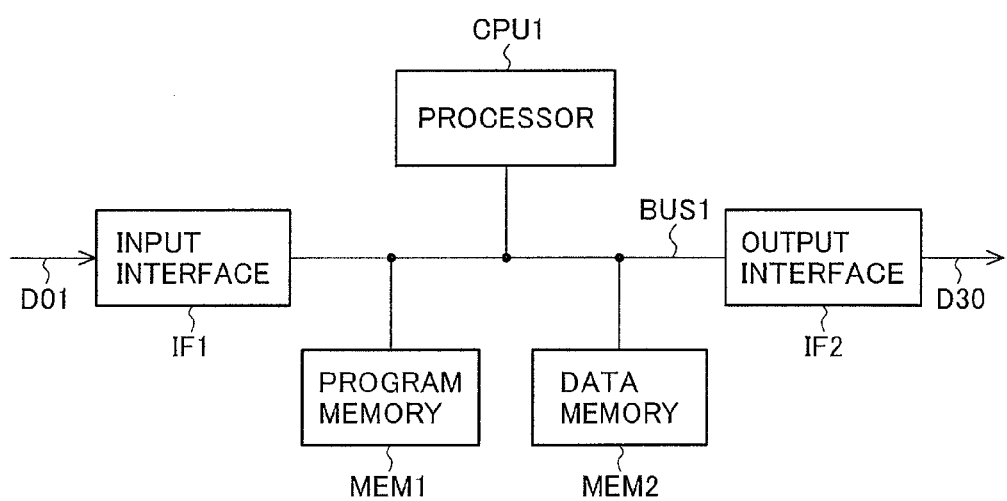
FIG.9
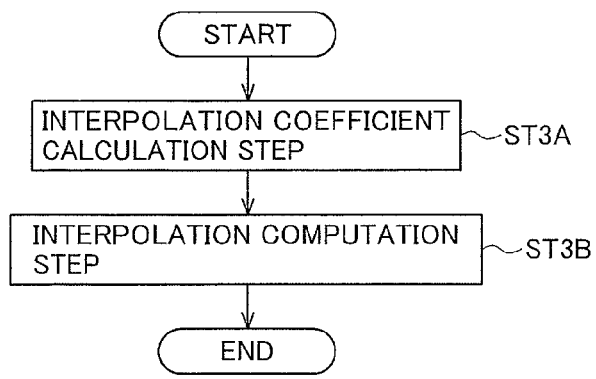

IMAGE MAGNIFICATION DEVICE AND METHOD

TECHNICAL FIELD

The present invention relates to an image magnification device and method.

BACKGROUND ART

Image processing devices that perform image magnification by switching interpolation methods according to edge shapes are already known. The image processing device in Patent Reference 1, for example, prevents edge degradation due to interpolation computation by switching the interpolation method when particular edge shapes are detected. The detection of the particular edge shapes in Patent Reference 1 is carried out by comparison with predetermined patterns.

PRIOR ART REFERENCES

Patent References

Patent Reference 1: Japanese Patent Application Publication No. 7-50752 (paragraph 0021)

SUMMARY OF THE INVENTION

Problems to be Solved by the Invention

When detection of particular edge shapes is carried out by comparison with predetermined patterns as described above, however, depending on the edge shape, there are cases in which optimal interpolation computations cannot be performed. That is, even when an edge shape deviates slightly from the patterns prepared for use in detection, it is necessarily classified as one of the patterns, so that depending on the edge shape, the result of edge shape detection is not always optimal. Increasing the number of comparison patterns to make edge shape detection more sensitive could be considered as a way of solving this problem, but in the end, the edge shape is still classified as one of a finite number of patterns, so that, depending on the edge shape, the result of edge shape detection may not be optimal.

Means for Solving the Problem

An image magnification device in one aspect of the invention is for generating a high-resolution image from a low-resolution image, comprising:

an interpolation computation unit that treats, as positions of interest, positions where pixels in the high-resolution image occupy when the high-resolution image is superimposed on the low-resolution image, and for each position of interest, obtains a pixel value for a pixel of interest assumed to be present at that position by performing an interpolation computation using pixel values of a plurality of pixels within the low-resolution image and interpolation coefficients for the plurality of pixels; and an interpolation coefficient calculation unit that obtains the interpolation coefficients by giving the interpolation coefficients values that increase with increasing strength of correlation of the pixels in the plurality of pixels in the low-resolution image with the pixel of interest, and outputs the interpolation coefficients to the interpolation computation unit; wherein the interpolation coefficient calculation unit includes a first variation quantity calculation unit for obtaining a first variation quantity in a first direction centered on each pixel in the low-resolution image, a second variation quantity calculation unit for obtaining a second variation quantity in a second direction centered on each pixel in the low-resolution image, a direction calculation unit for using a first interpolated variation quantity obtained by interpolation from the first variation quantity and a second interpolated variation quantity obtained by interpolation from the second variation quantity to obtain direction indication data indicating a direction of strong correlation, and a coefficient calculation unit for obtaining the correlation coefficients from the direction indication data.

An image magnification method in another aspect of the invention is for generating a high-resolution image from a low-resolution image, comprising:

an interpolation computation step that treats, as positions of interest, positions where pixels in the high-resolution image occupy when the high-resolution image is superimposed on the low-resolution image, and for each position of interest, obtains a pixel value for a pixel of interest assumed to be present at that position by performing an interpolation computation using pixel values of a plurality of pixels within the low-resolution image and interpolation coefficients for the plurality of pixels; and an interpolation coefficient calculation step that obtains the interpolation coefficients by giving the interpolation coefficients values that increase with increasing strength of correlation of the pixels in the plurality of pixels in the low-resolution image with the pixel of interest, and outputs the interpolation coefficients to the interpolation computation step; wherein the interpolation coefficient calculation step includes a first variation quantity calculation step for obtaining a first variation quantity in a first direction centered on each pixel in the low-resolution image, a second variation quantity calculation step for obtaining a second variation quantity in a second direction centered on each pixel in the low-resolution image, a direction calculation step for using a first interpolated variation quantity obtained by interpolation from the first variation quantity and a second interpolated variation quantity obtained by interpolation from the second variation quantity to obtain direction indication data indicating a direction of strong correlation, and a coefficient calculation step for obtaining the correlation coefficients from the direction indication data.

Effect of the Invention

According to the present invention, edge angles or edge shapes are not classified into predetermined patterns, so that appropriate interpolation computations can always be carried out.

BRIEF DESCRIPTION OF THE DRAWINGS

FIGS. 7(A), 7(B), and 7(C) are drawings showing examples of images in which at least one of the absolute values of the estimated variation quantity values D3A51 and D3A52 in FIG. 4 is small.

FIG. 8 is a block diagram showing a computing device for carrying out an image magnification method according to a second embodiment of the invention.

FIG. 9 is a flowchart showing a processing procedure in the image magnification method according to the second embodiment.

MODE FOR CARRYING OUT THE INVENTION

First Embodiment

Figure 1:
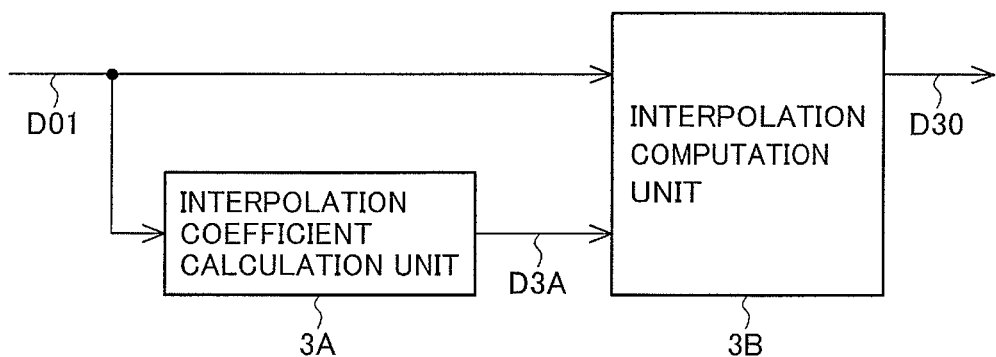
FIG. 1 is a block diagram showing an image magnification device according to a first embodiment of the invention.

FIG. 1 is a drawing showing the configuration of an image magnification device according to the first embodiment of the invention. The image magnification device according to the first embodiment includes an interpolation coefficient calculation unit 3A and an interpolation computation unit 3B, receives one low-resolution image as an input image, and outputs one high-resolution image as an output image. In FIG. 1, a low-resolution image D01 is designated as the input image and a high-resolution image D30 is designated as the output image.

Figure 2:
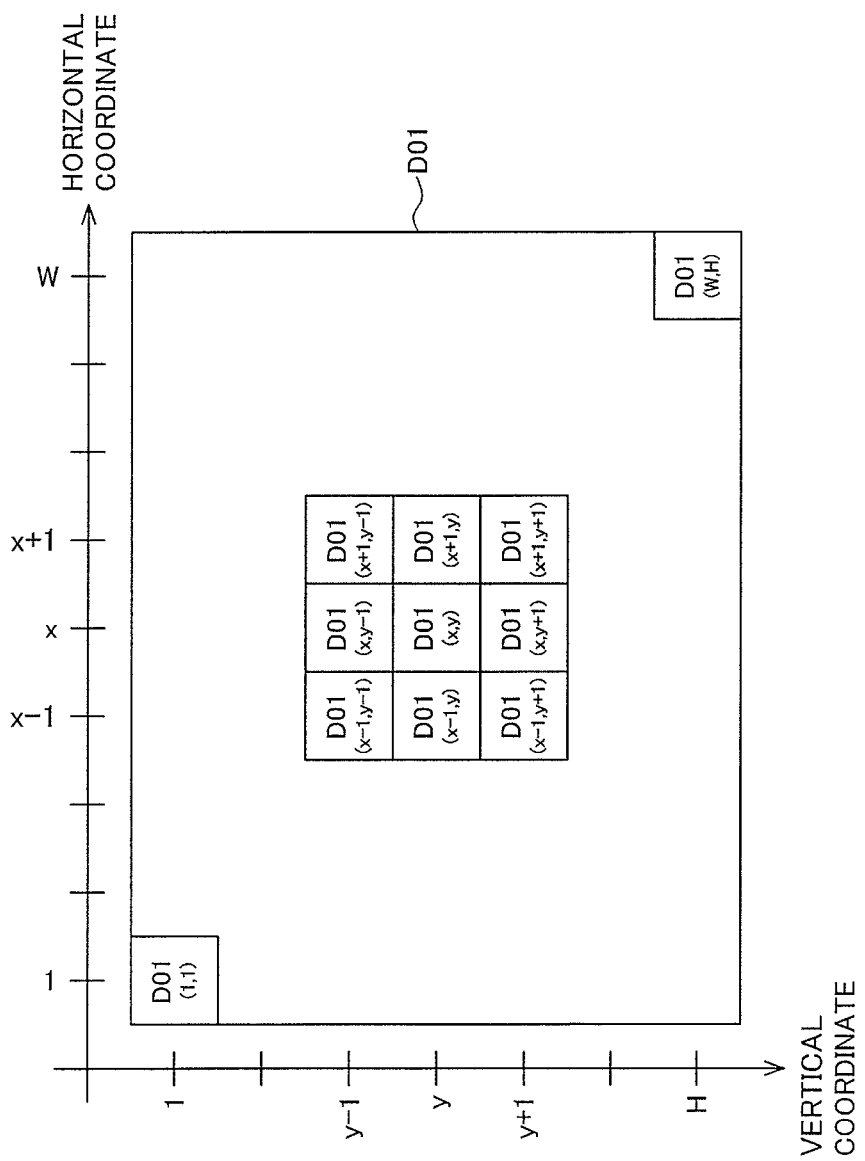
FIG. 2 is a drawing schematically showing an array of pixels in a low-resolution image D01.

FIG. 2 is a drawing showing the low-resolution image D01, in which the low-resolution image D01 and some of the pixels constituting the low-resolution image D01 are represented schematically. The smallest squares in FIG. 2 represent pixels. Horizontal coordinates and vertical coordinates are defined in the horizontal direction and vertical direction of the low-resolution image D01; the value of a pixel with horizontal coordinate x and vertical coordinate y is denoted D01(x, y). The distance between the scale marks on the coordinate axes is assumed to be equal to the distance between the pixels constituting the input image D0. The exemplary low-resolution image D01 shown in FIG. 2 measures W pixels in the horizontal direction and H pixels in the vertical direction.

The operation of the image magnification device according to the first embodiment of the invention and its individual components will be described below.

The interpolation computation unit 3B determines the value of each pixel in the high-resolution image D30 by an interpolation computation or calculation. Specifically, when the low-resolution image D01 and the high-resolution image D30 are mutually superimposed, that is, the high-resolution image D30 is superimposed on the plane representing the low-resolution image D01, a position on which a pixel in the high-resolution image D30 occupies is treated as a position of interest, and a pixel value for a pixel assumed to be present at the position of interest is calculated by an interpolation computation using the pixel values of a plurality of pixels among the pixels in the low-resolution image D01 that are near the position of interest and interpolation coefficients for the plurality of pixels.

The pixel in the high-resolution image D30 located at the position with horizontal coordinate s and vertical coordinate t on the coordinate plane representing the low-resolution image D01 will be denoted D30(s, t) below. When horizontal and vertical coordinate values are given in the following description, unless otherwise specified, the coordinate values are values in the coordinate plane representing the low-resolution image D01.

The positions of interest at which pixels of the high-resolution image D30 occupy when the high-resolution image D30 is superimposed on the coordinate plane representing the low-resolution image D01 are determined from the ratio of the number of pixels in the low-resolution image D01 and the number of pixels in the high-resolution image D30. Specifically, if the number of pixels of the high-resolution image D30 in the horizontal direction is U and the number of pixels in the vertical direction is V, the horizontal coordinates s of the positions of interest can be expressed by the following expression (1) by using a variable i that takes integer values between 1 and U,

[Expression 1]

$$s = 1 + (i-1) \times \frac{W}{U} \quad (1)$$

and the vertical coordinates t of the positions of interest can be expressed by the following expression (2) by using a variable j that takes integer values between 1 and V.

[Expression 2]

$$t = 1 + (j-1) \times \frac{H}{V} \quad (2)$$

Figure 3:
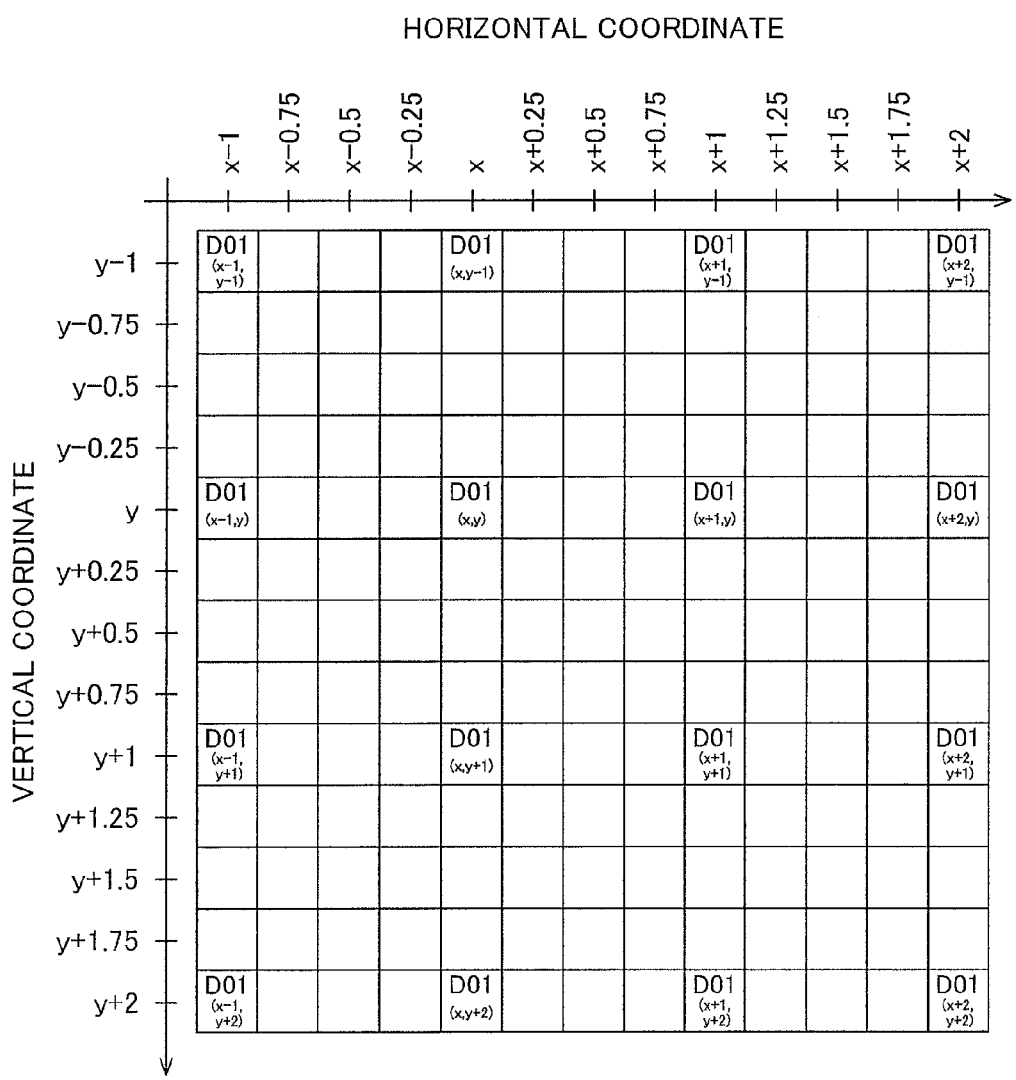
FIG. 3 is a drawing schematically showing positions of interest.

Taking as an example the case where the number of pixels of the high-resolution image D30 is quadruple the number of pixels of the low-resolution image D01 in both the horizontal and vertical directions, that is, U=4W and V=4H, the coordinate positions at which the horizontal coordinate is 1+(i−1)× 0.25 and the vertical coordinate is 1+(j−1)×0.25 on the plane representing the low-resolution image D01 become positions of interest. FIG. 3 is a drawing showing the positions of interest on the coordinate space shown in FIG. 2. In FIG. 3, the smallest squares represent the individual positions of interest or the pixels of the high-resolution image D30 occupying the individual positions of interest. For positions matching the positions of pixels in the low-resolution image D01, among the positions of interest, the pixel values in the low-resolution image D01 are shown.

The pixel value calculator 30 obtains a pixel value for a pixel assumed to be present at each of the positions of interest, and treats it as a pixel value in the high-resolution image D30. For example, the following pixel values are obtained.

D30(x,y),

D30(x+0.25,y),

D30(x,y+0.25),

D30(x+0.5,y+1.5)

That is, s takes discrete values in steps of W/U times, e.g., 0.25 times, the pixel pitch in the low-resolution image, and t takes discrete values in steps of H/V times, e.g., 0.25 times, the pixel pitch in the low-resolution image.

The interpolation coefficient calculation unit 3A and interpolation computation unit 3B will now be described.

First, the operation and configuration of the interpolation coefficient calculation unit 3A will be described. As will be described in detail below, the interpolation coefficient calculation unit 3A obtains correlation coefficients D3A having values that are larger for those of the pixels, among the pixels in the low-resolution image D01, that are more strongly correlated with the pixel of interest, and treats the pixels located in a direction of strong correlation as strongly correlated pixels.

Figure 4:
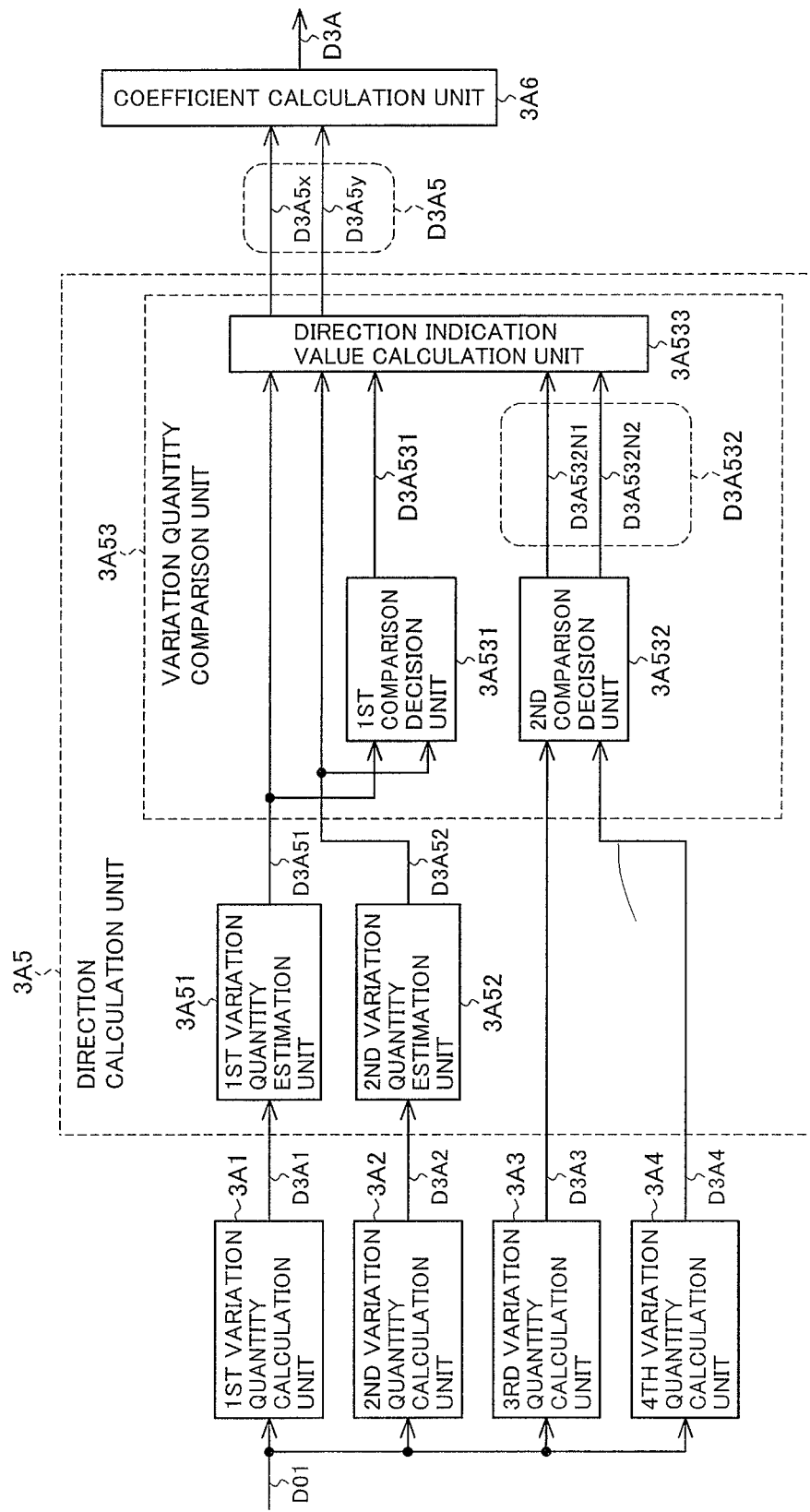
FIG. 4 is a block diagram showing an exemplary configuration of the interpolation coefficient calculation unit 3A in FIG. 1.

FIG. 4 is a drawing showing an exemplary configuration of the interpolation coefficient calculation unit 3A. The interpolation coefficient calculation unit 3A includes a first variation quantity calculation unit 3A1, a second variation quantity calculation unit 3A2, a third variation quantity calculation unit 3A3, a fourth variation quantity calculation unit 3A4, a direction calculation unit 3A5, and a coefficient calculation unit 3A6.

For each pixel in the low-resolution image D01, the first variation quantity calculation unit 3A1 calculates the first derivative of the pixel value in the horizontal direction and outputs the calculated result as a first variation quantity D3A1. If the first derivative of the pixel value in the horizontal direction determined for the pixel with the horizontal coordinate denoted x and the vertical coordinate denoted y in FIG. 2 is denoted D3A1(x, y), then D3A1(x, y) is calculated by the following expression (3).

[Expression 3]

$$D3A1(x, y) = \frac{D01(x+1, y) - D01(x-1, y)}{2} \quad (3)$$

For each pixel in the low-resolution image D01, the second variation quantity calculation unit 3A2 calculates the first derivative of the pixel value in the vertical direction and outputs the calculated result as a second variation quantity D3A2. If the first derivative of the pixel value in the vertical direction determined for the pixel with the horizontal coordinate denoted x and the vertical coordinate denoted y in FIG. 2 is denoted D3A2(x, y), then D3A2(x, y) is calculated by the following expression (4).

[Expression 4]

$$D3A2(x, y) = \frac{D01(x, y+1) - D01(x, y-1)}{2} \quad (4)$$

For each pixel in the low-resolution image D01, the third variation quantity calculation unit 3A3 calculates the second derivative of the pixel value in the horizontal direction and outputs the calculated result as a third variation quantity D3A3. If the second derivative of the pixel value in the horizontal direction determined for the pixel with the horizontal coordinate denoted x and the vertical coordinate denoted y in FIG. 2 is denoted D3A3(x, y), then D3A3(x, y) is calculated by the following expression (5).

[Expression 5]

$$D3A3(x,y)=D01(x+1,y)-2 \times D01(x,y)+D01(x-1,y) \quad (5)$$

For each pixel in the low-resolution image D01, the fourth variation quantity calculation unit 3A4 calculates the second derivative of the pixel value in the vertical direction and outputs the calculated result as a fourth variation quantity D3A4. If the second derivative of the pixel value in the vertical direction determined for the pixel with the horizontal coordinate denoted x and the vertical coordinate denoted y in FIG. 2 is denoted D3A4(x, y), then D3A4(x, y) is calculated by the following expression (6).

[Expression 6]

$$D3A4(x,y)=D01(x,y+1)-2 \times D01(x,y)+D01(x,y-1) \quad (6)$$

From the first variation quantity D3A1, second variation quantity D3A2, third variation quantity D3A3, and fourth variation quantity D3A4, the direction calculation unit 3A5 obtains direction indication data D3A5 indicating which direction centered on the position of interest has strong correlation. A direction strongly correlated with the position of interest means a direction in which the pixels have pixel values close to the pixel value calculated for the pixel assumed to be present at the position of interest.

As shown in FIG. 4, the direction calculation unit 3A5 includes a first variation quantity estimation unit 3A51, a second variation quantity estimation unit 3A52, and a variation quantity comparison unit 3A53.

The first variation quantity estimation unit 3A51 estimates the value of the first variation quantity at the position of interest from the first variation quantities D3A1 determined for pixels located around the position of interest in the low-resolution image D01, and outputs the result as a first estimated variation quantity value D3A51.

Linear interpolation, for example, is used to determine the estimated variation quantity value D3A51. In this case, if the position of interest is represented by horizontal coordinate s and vertical coordinate t, the estimated variation quantity value D3A51(s, t) of the position of interest is calculated by the following expression (7).

[Expression 7]

$$D3A51(s, t) = (1 - tdec) \cdot ((1 - sdec) \cdot D3A1(s - sdec, t - tdec) + \\ sdec \cdot D3A1(s - sdec + 1, t - tdec)) + \\ tdec \cdot ((1 - sdec) \cdot D3A1(s - sdec, t - tdec + 1) + \\ sdec \cdot D3A1(s - sdec + 1, t - tdec + 1)) \quad (7)$$

The symbols sdec and tdec in the above expression respectively represent the value of the fraction part of coordinate value s and the value of the fraction part of coordinate value t.

The second variation quantity estimation unit 3A52 estimates the value of the second variation quantity at the position of interest from the second variation quantities D3A2 obtained for pixels located around the position of interest in the low-resolution image D01, and outputs the result as a second estimated variation quantity value D3A52. Linear interpolation, for example, is used to determine, the estimated variation quantity value D3A52. In this case, if the position of interest is represented by horizontal coordinate s and vertical coordinate t, the estimated variation quantity value D3A52(s, t) of the position of interest is calculated by the following expression (8).

[Expression 8]

$$D3A52(s, t) = (1 - tdec) \cdot ((1 - sdec) \cdot D3A2(s - sdec, t - tdec) + \\ sdec \cdot D3A2(s - sdec + 1, t - tdec)) + \\ tdec \cdot ((1 - sdec) \cdot D3A2(s - sdec, t - tdec + 1) + \\ sdec \cdot D3A2(s - sdec + 1, t - tdec + 1)) \quad (8)$$

When the estimated variation quantity value D3A51 and estimated variation quantity value D3A52 are obtained by interpolation, they are also referred to as interpolated variation quantities.

The variation quantity comparison unit 3A53 determines direction indication data D3A5 for each position of interest based on the values of the first estimated variation quantity value D3A51, second variation quantity estimation value D3A52, third variation quantity D3A3, and fourth variation quantity D3A4 and outputs the result. Here, the direction indication data D3A5 is a two-dimensional value consisting of a first direction indication value D3A5x and a second direction indication value D3A5y.

As shown in FIG. 4, the variation quantity comparison unit 3A53 includes a first comparison decision unit 3A531, a second comparison decision unit 3A532, and a direction indication value calculation unit 3A533.

If the absolute value of the first estimated variation quantity value D3A51 is greater than a first threshold value D3A51t and the absolute value of the second estimated variation quantity value D3A52 is greater than a second threshold value D3A52t, the first comparison decision unit 3A531 outputs a first value (e.g., '1') as a first comparison result D3A531; otherwise, it outputs a second value (e.g., '0') as the first comparison result D3A531.

The second comparison decision unit 3A532 checks, for each pixel located around a position of interest in the low-resolution image D01, the magnitude relationship between the absolute value of the third variation quantity D3A3 and the absolute value of the fourth variation quantity D3A4 obtained for the pixel. Then it outputs the number of pixels for which the absolute value of the third variation quantity D3A3 is greater than the fourth variation quantity D3A4 as a first count value D3A532N1 and the number of pixels for which the absolute value of the fourth variation quantity D3A4 is greater than the third variation quantity D3A3 as a second count value D3A532N2. The data consisting of the first count value D3A532N1 and the second count value D3A532N2 may also be referred to as a second comparison result D3A532.

Figure 5:
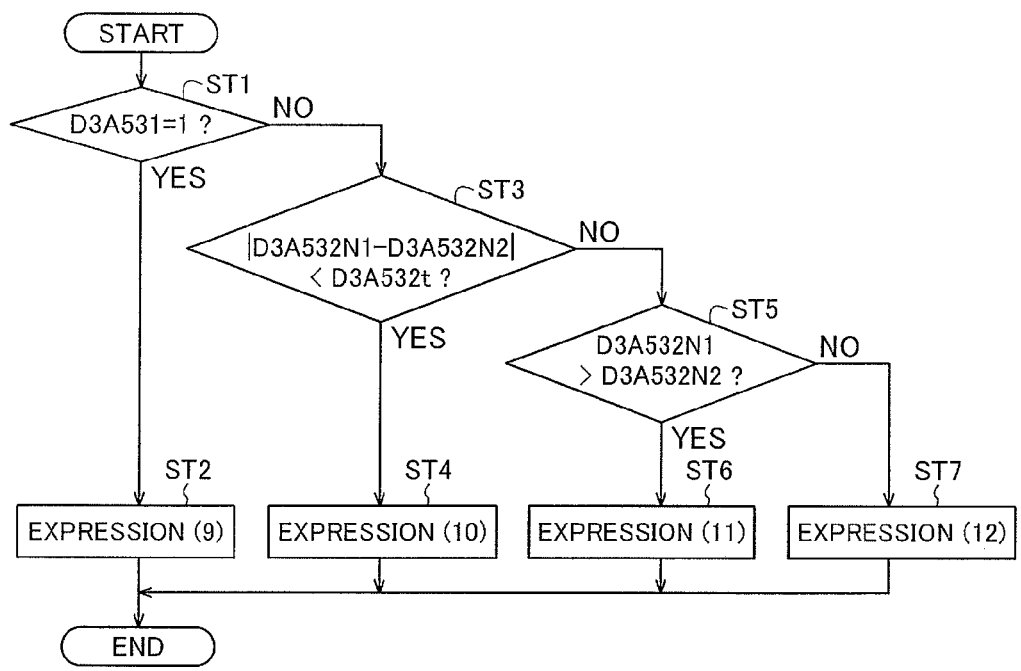
FIG. 5 is a flowchart illustrating the operation of the direction indication value calculation unit 3A533.

Based on the first estimated variation quantity value D3A51, second estimated variation quantity value D3A52, first comparison result D3A531, and second comparison result D3A532, the direction indication value calculation unit 3A533 generates and outputs the direction indication data D3A5 as follows. As described earlier, the direction indication data D3A5 is a two-dimensional value consisting of the first direction indication value D3A5x and the second direction indication value D3A5y. How the direction indication value calculation unit 3A533 obtains the first direction indication value D3A5x and second direction indication value D3A5y will now be described using the flowchart shown in FIG. 5.

The direction indication value calculation unit 3A533 first checks the value of the first comparison result D3A531 in step ST1. If the value is the first value ('1') (i.e., if the first estimated variation quantity value D3A51 and second estimated variation quantity value D3A52 are both large), the process proceeds to step ST2. In step ST2, the first direction indication value D3A5x and second direction indication value D3A5y are calculated by the following expression (9).

[Expression 9]

$$D3A5x = D3A51/\sqrt{D3A51^2 + D3A52^2}$$

$$D3A5y = D3A52/\sqrt{D3A51^2 + D3A52^2} \quad (9)$$

If the value of the first comparison result D3A531 is the second value ('0') (i.e., if either of the horizontal variation quantity and vertical variation quantity respectively calculated by the first variation quantity calculation unit 3A1 and second variation quantity calculation unit 3A2 is small), the process proceeds to step ST3. In step ST3, the difference between the first count value D3A532N1 and the second count value D3A532N2 is compared. If the absolute value of the difference is smaller than a third threshold value D3A532t, the process proceeds to step ST4. In step ST4, the first direction indication value D3A5x and second direction indication value D3A5y are calculated by the following expression (10).

[Expression 10]

$$D3A5x = 0$$

$$D3A5y = 0 \quad (10)$$

If the absolute value of the difference between the first count value D3A532N1 and second count value D3A532N2 is equal to or greater than the third threshold value D3A532t, the process proceeds to step ST5. In step ST5, the first count value D3A532N1 is compared with the second count value D3A532N2. If the first count value D3A532N1 is greater than the second count value D3A532N2, the process proceeds to step ST6. In step ST6, the first direction indication value D3A5x and second direction indication value D3A5y are calculated by the following expression (11).

[Expression 11]

$$D3A5x = 1$$

$$D3A5y = 0 \quad (11)$$

If the first count value D3A532N1 is smaller than the second count value D3A532N2, the process proceeds to step ST7. In step ST7, the first direction indication value D3A5x and second direction indication value D3A5y are calculated by the following expression (12).

[Expression 12]

$$D3A5x = 0$$

$$D3A5y = 1 \quad (12)$$

The coefficient calculation unit 3A6 calculates the interpolation coefficients D3A for the pixels constituting the low-resolution image D01 based on the direction indication data D3A5, and outputs the calculated interpolated coefficients D3A. Here, the interpolation coefficients D3A are calculated so as to have values that are larger for pixels located in a direction closer to the direction determined to be strongly correlated with the position of interest.

When the horizontal coordinate of the position of interest is s and the vertical coordinate of the position of interest is t, and D3A(p, q, s, t) represents the interpolation coefficient D3A calculated for a pixel which is located at a position with horizontal coordinate p and vertical coordinate q, and which is among the pixels constituting the low-resolution image D01, a specific exemplary method of calculating the interpolation coefficient D3A(p, q, s, t) will be described below.

In the example in FIG. 3, p and q are discrete values with discrete steps of 0.25 pixels (0.25 times the pixel pitch in the low-resolution image), while s and t are discrete values with discrete steps of, respectively, W/U times, e.g., 0.25 times, the pixel pitch in the low-resolution image and H/V times, e.g., 0.25 times, the pixel pitch in the low-resolution image, as described above.

The interpolation coefficient D3A(p, q, s, t) can be obtained as a monotonically decreasing function of a numerical value r given by the following expression (13).

[Expression 13]

$$r = |(p-s) \times D3A5x(s,t) + (q-t) \times D3A5y(s,t)| \quad (13)$$

That is, by using a monotonically decreasing function f(r) of the variable r, the interpolation coefficients D3A(p, q, s, t) are calculated as follows.

[Expression 14]

$$\begin{aligned}D3A(p, q, s, t) &= f(r) \\ &= f(|(p-s) \times D3A5x(s,t) + (q-t) \times D3A5y(s,t)|)\end{aligned} \quad (14)$$

In the above expression (14), D3A5$x$(s, t) and D3A5$y$(s, t) respectively represent the first direction indication data D3Ax and second direction indication data D3Ay calculated for the position of interest with horizontal coordinate represented by s and vertical coordinate represented by t.

Figure 6A:
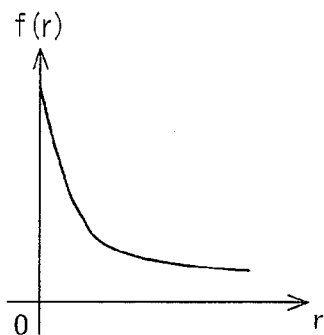
FIGS. 6(A) and 6(B) are drawings showing examples of monotonically decreasing functions f(r).
Figure 6B:
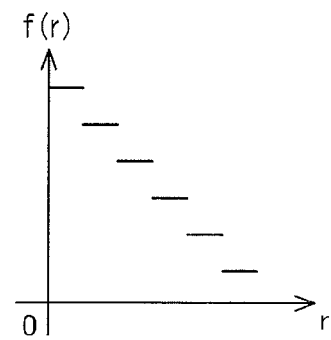

Exemplary monotonically decreasing functions f(r) of the variable r are shown in FIGS. 6(A) and 6(B). A function such that f(r1) is less than f(r2) (f(r1)<f(r2)) if r1 is greater than r2 (r1>r2), as shown in FIG. 6(A), or a function such that f(r1) is equal to or less than f(r2) (f(r1)≤f(r2)) if r1 is greater than r2 (r1>r2), as shown in FIG. 6(B), can be used as the monotonically decreasing function f(r) of the variable r.

The reason why the above-described method makes it possible to determine the interpolation coefficients D3A to have values that are larger for pixels located in a direction closer to the direction determined to be strongly correlated with the position of interest will be described later.

The interpolation coefficient calculation unit 3A is configured and operates as above.

Next, the operation of the interpolation computation unit 3B will be described.

The interpolation computation unit 3B obtains the pixel value D30(s, t) by an interpolation computation. The interpolation computation is based on the pixel values D01(p, q) of the pixels in the low-resolution image D01 and their interpolation coefficients D3A(p, q, s, t), and may be expressed, for example, as follows.

[Expression 15]

$$D30(s, t) = \frac{\sum_{p,q} D3A(p, q, s, t) \times D01(p, q)}{\sum_{p,q} D3A(p, q, s, t)} \quad (15)$$

In the above expression (15), D01(p, q) represents the pixel value assigned to the pixel located at the position represented by horizontal coordinate p and vertical coordinate q among the pixels constituting the low-resolution image D01.

The operation and effect of the image magnification device according to the first embodiment of the invention will be described below.

First, the estimated variation quantity values D3A51 and D3A52 will be described. As explained below, if the high-resolution image D30 is represented by a curved surface in a coordinate space in which the x-axis corresponds to the horizontal coordinates in the high-resolution image D30, the y-axis corresponds to the vertical coordinates in the high-resolution image D30, and the z-axis corresponds to brightness values in the high-resolution image D30, the two-dimensional vector having the estimated variation quantity value D3A51 as its first component and the estimated variation quantity value D3A52 as its second component is a vector corresponding to the gradient at each point on the curved surface representing the high-resolution image D30.

The gradient of the curved surface will now be described. In general, a curved surface can be defined by a function of two variables in a coordinate space with an x-axis, a y-axis, and a z-axis. If the function of two variables is represented as z=f(x, y), the gradient of the curved surface is represented by the following two-dimensional vector, using partial differentiation.

[Expression 16]

$$\left( \frac{\partial}{\partial x} f(x, y), \frac{\partial}{\partial y} f(x, y) \right) \quad (16)$$

A gradient can be calculated for each point on the curved surface z=f(x, y). The gradient calculated for a certain point on the curved surface z=f(x, y) is a vector indicating a direction orthogonal to a contour line passing through the point. Incidentally, the value taken by f(x, y) is the pixel value of a pixel located at a position with horizontal coordinate x and vertical coordinate y.

Here, the two-dimensional vector (D3A1, D3A2) with the first variation quantity D3A1 represented by expression (3) as its first component and the second variation quantity D3A2 represented by expression (4) as its second component can be seen to be the gradient of the curved surface representing the low-resolution image D01.

Given a curved surface representing an image, a contour line in the curved surface is a sequence of pixels with identical pixel values in the image represented by the curved surface. Accordingly, pixels having the same pixel value as the pixel located at a position for which a gradient is calculated can be considered to be aligned at points on the curved surface representing the image in the direction perpendicular to the direction indicated by the gradient.

From the above property, if the gradient at a position of interest on the curved surface representing the high-resolution image D30 can be calculated, it becomes possible to determine a direction in which pixels having pixel values close to the pixel value of the pixel located at the position of interest are aligned, that is, a direction strongly correlated with the pixel of interest.

For the high-resolution image D30, however, most pixel values are unknown, so that it is difficult to calculate the gradient. Thus, in the image magnification device according to the first embodiment of the invention, the gradients for the high-resolution image D30 are determined by approximation from the gradients of the low-resolution image D01. The reason why it is possible to approximate the gradients of the high-resolution image D30 from the gradients of the low-resolution image D01 is as follows.

In general, the pixel values of the pixels constituting an image vary smoothly. Accordingly, the function of two variables corresponding to a certain image can be considered to be a continuous function with continuously varying values. The first derivative a continuous function also varies continuously, so that the first derivative of the continuous function at an arbitrary point is substantially the same as a value obtained by interpolation from the first derivative values given at a plurality of points located around that point. In consideration of the above property and the fact that the gradient of the curved surface is represented by the first derivative of the function representing the curved surface, it can be understood that the gradient at each point on the curved surface can also be approximated by interpolation from the gradients given at a plurality of points located near the point.

If the high-resolution image D30 and low-resolution image D01 are compared, ignoring the difference in the number of their pixels, they are the same image, and the curved surfaces representing them are in close agreement in the coordinate space. Thus, the gradients of the high-resolution image D30 can be approximately obtained by interpolation from the gradients in the low-resolution image D01 as in expressions (7) and (8).

Specifically, a two-dimensional vector representing a gradient in the low-resolution image D01 and having the estimated variation quantity value D3A51 and estimated variation quantity value D3A52 obtained by interpolation from the first variation quantity D3A1 and second variation quantity D3A2, respectively, as its first component and second component is a vector approximately representing the corresponding gradient in the high-resolution image D30.

Next, the two-dimensional vector with the first direction indication value D3A5$x$ and second direction indication value D3A5$y$ as its first component and second component will be described.

The two-dimensional vector having the first direction indication value D3A5$x$ and second direction indication value D3A5$y$ expressed by equation (9) as its first component and second component, respectively, is a unit vector parallel to the two-dimensional vector having the estimated variation quantity value D3A51 as its first component and the estimated variation quantity value D3A52 as its second component, so that this vector points in the same direction as the gradient. Since the direction of strong correlation can be determined from the gradient, the direction of strong correlation can also be determined from the first direction indication value D3A5$x$ and second direction indication value D3A5$y$ expressed by expression (9).

When at least one of the absolute values of the estimated variation quantity value D3A51 and estimated variation quantity value D3A52 is small, the first direction indication value D3A5$x$ and second direction indication value D3A5$y$ are obtained from the result of a comparison between the third variation quantity D3A3 and fourth variation quantity D3A4. This has the following effect.

FIGS. 7(A) to 7(C) represent typical images in which at least one of the absolute values of the estimated variation quantity values D3A51 and D3A52 has a small value. FIG. 7(A) shows a case in which the image has a vertical stripe pattern; FIG. 7(B) shows a case in which the image has a horizontal stripe pattern; and FIG. 7(C) shows a case in which the image has no variation in pixel value.

When there is a vertical stripe pattern in the image as in FIG. 7(A), the absolute value of the second variation quantity D3A2 cannot be very large, so that the absolute value of the estimated variation quantity value D3A52 obtained by interpolation from the second variation quantity D3A2 cannot be very large either.

When there is a horizontal stripe pattern in the image as in FIG. 7(B), the absolute value of the first variation quantity D3A1 cannot be very large, so that the absolute value of the estimated variation quantity value D3A51 obtained by interpolation from the first variation quantity D3A1 cannot be very large either.

When there is no variation in pixel value in the image as in FIG. 7(C), the absolute values of both the first variation quantity D3A1 and second variation quantity D3A2 cannot be very large, so that the absolute values of the estimated variation quantity values D3A51 and D3A52 cannot be very large either.

The case in which there is a vertical stripe pattern in the low-resolution image D01 as in FIG. 7(A) will now be considered. In this case, the absolute values of the horizontal first derivatives of the pixel values of the pixels in the low-resolution image D01 are expected to be somewhat large. The first derivatives here can take positive values or negative values.

The first derivative calculated for a position of interest in the high-resolution image D30 is given by interpolation from the first derivatives calculated for pixels in the low-resolution image D01.

First the interpolation of the first derivative in the horizontal direction performed by expression (7) will be considered. Depending on the distance between two adjacent stripes, positive and negative values are added in the interpolation computation performed with expression (7). For example, if D3A1(s−sdec, t−tdec) and D3A1(s−sdec, t−tdec+1) are positive values and D3A1(s−sdec+1, t−tdec) and D3A1(s−sdec+1, t−tdec+1) are negative values, these positive and negative values are added, so that the estimated variation quantity value D3A51 obtained as a result of the interpolation computation may be a value near zero, that is, a small value.

Next, the interpolation of the first derivative in the vertical direction performed by expression (8) will be considered. In this case, since the absolute values of D3A2(s−sdec, t−tdec), D3A2(s−sdec, t−tdec+1), D3A2(s−sdec+1, t−tdec), and D3A2(s−sdec+1, t−tdec+1) are all small values, the estimated variation quantity value D3A52 obtained as a result of the interpolation computation is also a small value.

In the case of strong correlation in the vertical direction, as with the vertical stripe pattern, the first direction indication value D3A5$x$ should take a value near 1 and the second direction indication value D3A5$y$ should take a value near 0. For this, the absolute value of the estimated variation quantity value D3A51 must be much larger than the absolute value of the estimated variation quantity value D3A52, but as described earlier, the absolute value of the estimated variation quantity value D3A51 may take a small value, so that there is no guarantee that the desired relationship will be satisfied. In other words, when there is a vertical stripe pattern, in some cases the first direction indication value D3A5$x$ and second direction indication value D3A5$y$ cannot be obtained appropriately from the estimated variation quantity values D3A51 and D3A52.

Similarly, when there is a horizontal stripe pattern, the first direction indication value D3A5$x$ should take a value near '0' and the second direction indication value D3A5$y$ should take a value near '1', but there are some cases in which the first direction indication value D3A5$x$ and second direction indication value D3A5$y$ cannot be obtained appropriately from the estimated variation quantity values D3A51 and D3A52.

Considering the second derivative of the pixel value calculated for each pixel in the low-resolution image D01 when there is a vertical stripe pattern as in FIG. 7(A), or when correlation is strong in the vertical direction, its absolute value in the vertical direction is a small value, but the absolute value of the second derivative in the horizontal direction may be somewhat large. Accordingly, when there is a vertical stripe pattern around the position of interest, a comparison between the absolute value of the second derivative in the horizontal direction and the absolute value of the second derivative in the vertical direction, calculated for each pixel near the position of interest in the low-resolution image D01, shows that there are more pixels for which the absolute value of the second derivative in the horizontal direction is larger than the absolute value of the second derivative in the vertical direction. Thus, the first count value D3A532N1 has a larger value than the second count value D3A532N2.

When there is a horizontal stripe pattern as in FIG. 7(B), or when correlation is strong in the horizontal direction, by similar reasoning, the second count value D3A532N2 will be larger than the first count value D3A532N1.

When there is no change in pixel value, as in FIG. 7(C), or when there is no particular direction of strong correlation, the absolute values of the horizontal and vertical second derivatives calculated for pixels neighboring the position of interest are not so large, and which takes the larger value is determined by chance. Therefore, when the absolute values of the vertical and horizontal second derivatives calculated for pixels near the position of interest are compared, there will be no great difference between the number of pixels for which the absolute value of the vertical second derivative is larger and the number of pixels for which the absolute value of the horizontal second derivative is larger. Therefore, the first count value D3A532N1 and second count value D3A532N2 will have substantially identical values.

Therefore, when at least one of the estimated variation quantity values D3A51 and D3A52 is small, whether there is a strong correlation in the vertical direction or horizontal direction, and whether or not there is a particular direction of strong correlation can be determined by use of the first count value D3A532N1 and second count value D3A532N2.

In other words, the first direction indication value D3A5$x$ and second direction indication value D3A5$y$ can be obtained appropriately by determining whether there is a strong correlation in the vertical direction or horizontal direction from the magnitude relationship between the first count value D3A532N1 and second count value D3A532N2. Specifically, when D3A532N1 >D3A532N2, there is a strong correlation in the vertical direction, so that the first direction indication value D3A5$x$ is set to '1' and the second direction indication value D3A5$y$ is set to '0'; conversely, when D3A532N1<D3A532N2, there is a strong correlation in the horizontal direction, so that the first direction indication value D3A5$x$ is set to '0' and the second direction indication value D3A5$y$ is set to '1'. The values of the interpolation coefficients D3A vary according to the first direction indication value D3A5$x$ and second direction indication value D3A5$y$, so that appropriate determination of the first direction indication value D3A5$x$ and second direction indication value D3A5$y$ leads to appropriate determination of the interpolation coefficients D3A.

The reason why the first direction indication value D3A5$x$ and second direction indication value D3A5$y$ are both set to zero, when there is no direction of strong correlation, that is, when the difference between the first count value D3A532N1 and second count value D3A532N2 is not very large, in addition to determining the first direction indication value D3A5$x$ and second direction indication value D3A5$y$, as described above, is that, if this is done, then when there is no particular direction of strong correlation, interpolation coefficients can be obtained such that the pixels neighboring the position of interest are equally weighted, as will be described later.

As above, by using the absolute value of the second derivative of change in pixel value in the horizontal direction and the absolute value of the second derivative of change in pixel value in the vertical direction in the low-resolution image D01, it becomes possible to determine the direction of strong correlation more accurately.

Furthermore, from the above description, it will be understood that the first direction indication value D3A5$x$ and second direction indication value D3A5$y$, or the direction indication data D3A5, are data representing the direction of strong correlation.

Although, in this embodiment, the first derivative of the change in pixel value in the horizontal direction in the low-resolution image D01 is used as the first variation quantity D3A1, the first derivative of the change in pixel value in the vertical direction in the low-resolution image D01 is used as the second variation quantity D3A2, the second derivative of the variation in pixel value in the horizontal direction in the low-resolution image D01 is used as the third variation quantity D3A3, and the second derivative of the change in pixel value in the vertical direction in the low-resolution image D01 is used as the fourth variation quantity D3A4, the values that can be used as the first variation quantity D3A1, second variation quantity D3A2, third variation quantity D3A3, and fourth variation quantity D3A4 are not limited to the above examples.

It is only necessary for the first and third variation quantities D3A1 and D3A3, and likewise the second and fourth variation quantities D3A2 and D3A4, to have different properties, or to be derived in different ways. If the first variation quantity D3A1 and third variation quantity D3A3 have different properties, and the second variation quantity D3A2 and fourth variation quantity D3A4 have different properties, then when it is difficult to determine a direction of strong correlation from the first and second variation quantities D3A1 and D3A2, it may be possible to determine a direction of strong correlation from the third and fourth variation quantities D3A3 and D3A4. That is, the direction of strong correlation can be obtained with greater accuracy.

The interpolation coefficients D3A will now be described.

A pixel located closer to a position in the direction of strong correlation is treated as a pixel of stronger correlation and given an interpolation coefficient D3A with a larger value.

If the horizontal coordinate of the position of interest is represented as s, the vertical coordinate as t, the first direction indication value D3A5$x$ at the position of interest as D3A5$x$ (s, t), and the second direction indication value D3A5$y$ as D3A5$y$(s, t), then the straight line tangent to the contour line passing through the position of interest is a line perpendicularly intersecting the two-dimensional vector (D3A5$x$(s, t), D3A5$y$(s, t)), so that it is expressed by the following equation.

[Expression 17]

$$(x-s) \times D3A5x(s,t) + (y-t) \times D3A5y(s,t) = 0 \quad (17)$$

Specifically, the set of coordinates (x, y) satisfying the above expression (17) is the perpendicularly intersecting line. The distance to this line from the position with horizontal coordinate represented by p and vertical coordinate represented by q can be calculated by the following expression.

[Expression 18]

$$\frac{|(p-s) \times D3A5x(s,t) + (q-t) \times D3A5y(s,t)|}{\sqrt{(D3A5x(s,t))^2 + (D3A5y(s,t))^2}} \quad (18)$$

Except when the first direction indication value D3A5*x* and second direction indication value D3A5*y* are determined by expression (10), the value of the denominator here is 1, so that expression (18) matches the r shown in expression (13).

In the vicinity of the position of interest, the contour line passing through the position of interest can be approximated by the line tangent to the contour line passing through the position of interest. The r shown in expression (13) can accordingly be considered as the approximate value of the distance from the contour line passing through the position of interest.

Since the interpolation coefficients D3A are given by a monotonically decreasing function of r, their values decrease with increasing distance from the contour line passing through the position of interest. Since points with the same pixel value as the position of interest are linked by the contour line, the correlation with the pixel of interest weakens with increasing distance from the contour line.

The interpolation coefficients D3A are accordingly calculated so as to have smaller values for pixels located in directions of weaker correlation. Conversely, they are calculated so as to have larger values for pixels located in directions of stronger correlation. That is, by determining the interpolation coefficients D3A from the first direction indication value D3A5*x* and second direction indication value D3A5*y*, correlation with the position of interest can be taken account in calculating the interpolation coefficients D3A.

When the first direction indication value D3A5*x* and second direction indication value D3A5*y* are determined by expression (10), then the above discussion does not remain valid. In this case, however, the value of r is always zero regardless of the values of p and q. Therefore, the same interpolation coefficients are used for all pixels.

It is when there is no particular direction of strong correlation that the first direction indication value D3A5*x* and second direction indication value D3A5*y* are determined by expression (10). Therefore, the interpolation coefficients need not be given larger values for any particular direction. In other words, when there is no direction of strong correlation, the interpolation coefficients can be calculated so that all directions are equally weighted.

As described above, in the image magnification device according to the invention, when the pixel value of a pixel (referred to below as a pixel of interest) located at a position of interest is determined by interpolation from pixel values of pixels located around the pixel of interest, a direction of strong correlation with the pixel of interest is determined, and interpolation coefficients are obtained according to the result, so that the interpolation coefficients for pixels that are more strongly correlated with the pixel of interest have greater weight. Since interpolation computations are carried out using interpolation coefficients determined as above, the pixel value of the pixel of interest can be calculated more accurately.

For example, suppose that there is a portion the brightness value of which varies greatly, such as an edge near a pixel of interest. In this case, in the vicinity of the pixel of interest, there are a region in which pixels with low brightness are grouped and a region in which pixels with high brightness are grouped. It will be assumed below that the pixel of interest is included in the low-brightness region.

In obtaining the pixel value of the pixel of interest by interpolation from the pixel values of pixels neighboring the pixel of interest, if the interpolation coefficients for the pixels neighboring the pixel of interest are determined without taking account of their strength of correlation with the pixel of interest, the high-brightness pixels and low-brightness pixels affect the pixel value of the pixel of interest to the same degree. As a result, the pixel value of the pixel of interest becomes larger than the pixel values of the low-brightness pixels located around it, resulting in a strange appearance.

In obtaining the pixel value of a pixel of interest by interpolation from the pixel values of pixels neighboring the pixel of interest, if the interpolation coefficients for the pixels neighboring the pixel of interest are determined by taking account of their strength of correlation with the pixel of interest, the high-brightness pixels are lightly weighted and the low-brightness pixels are heavily weighted. Therefore, the pixel value of the pixel of interest takes on a value generally similar to the values of the low-brightness pixels surrounding it, and the above strange appearance does not occur.

In the image magnification device according to the invention, as is clear from the way of calculation, the direction of strong correlation obtained for a pixel of interest is expressed by a continuous value. Accordingly, edge angles or edge shapes are not classified as one of a number of prescribed patterns, so that it is always possible to perform appropriate interpolation computations, regardless of edge shapes.

The method of determining correlation with the pixel of interest is not limited to the exemplary method above. In general, pixels distant from the pixel of interest are more likely to take pixel values differing from the pixel value of the pixel of interest. Therefore, in addition to being varied according to the quantity r appearing in expression (13), the interpolation coefficients may also be varied according to distance from the position of interest. For example, the interpolation coefficients may be made to decrease with increasing distance from the position of interest. By taking account of the distance from the pixel of interest, the correlation between the pixel of interest and its neighboring pixels is taken into account more precisely, so that the pixel value of the pixel of interest can be obtained more appropriately.

The r appearing in expression (13) depends on (p−s) and (q−t), and the f(r) in expression (14) decreases as r increases, so that the interpolation coefficients become smaller with increasing distance. Accordingly, if the interpolation coefficients are made to decrease with increasing distance from the pixel of interest, as well as with increasing value of r, the distance from the pixel of interest is taken into consideration twice.

The first variation quantity D3A1 need only have a value equivalent to the first derivative of the change in pixel value in the low-resolution image D01 in the horizontal direction. Accordingly, it can be calculated by any method that approximately gives the first derivative of the change in pixel value in the low-resolution image D01 in the horizontal direction; the method is not limited to expression (3).

Similarly, the second variation quantity D3A2 need only have a value equivalent to the first derivative of the change in pixel value in the low-resolution image D01 in the vertical direction. Accordingly, it can be calculated by any method that approximately gives the first derivative of the change in pixel value in the low-resolution image D01 in the vertical direction; the method is not limited to equation (4).

The first and second variation quantities D3A1 and D3A2 in the description above were a combination of the first derivative of the change in pixel value in the low-resolution image D01 in the horizontal direction and the first derivative of the change in pixel value in the low-resolution image D01 in the vertical direction, but it is only necessary for them to be a combination of the first derivatives of the changes in pixel values in two different directions. Therefore, in general, it is only necessary for the first variation quantity D3A1 to be the first derivative of the change in pixel value in the low-resolution image D01 in a first direction and the second variation quantity D3A2 to be the first derivative of the change in pixel value in the low-resolution image D01 in a second direction.

The third variation quantity D3A3 need only have a value equivalent to the second derivative of the change in pixel value in the low-resolution image D01 in the horizontal direction. Accordingly, it can be calculated by any method that approximately gives the second derivative of the change in pixel value in the low-resolution image D01 in the horizontal direction; the method is not limited to equation (5).

Similarly, the fourth variation quantity D3A4 need only have a value equivalent to the second derivative of the change in pixel value in the low-resolution image D01 in the vertical direction. Accordingly, it can be calculated by any method that approximately gives the second derivative of the change in pixel value in the low-resolution image D01 in the vertical direction; the method is not limited to equation (6).

The third and fourth variation quantities D3A3 and D3A4 in the description above formed a combination of the second derivatives of the changes in the pixel values of low-resolution image D01 in the horizontal and vertical directions, but it is only necessary for them to be a combination of the second derivatives of the changes in pixel values in two different directions. The direction of the changes in the third variation quantity D3A3 and the direction of the changes in the fourth variation quantity need not be the same as the direction of the changes in the first variation quantity (the first direction) and the direction of the changes in the second variation quantity (the second direction). Therefore, in general, it is only necessary for the third variation quantity D3A3 to be the second derivative of the changes in the pixel values of low-resolution image D01 in a third direction and the fourth variation quantity D3A4 to be the second derivative of the changes in the pixel values of low-resolution image D01 in a fourth direction.

The pixel value calculator 30 uses the interpolation computation described above to obtain pixel values for pixels present at all positions of interest, but at those of the positions of interest that match positions of pixels in the low-resolution image D01, the unaltered pixel values in the low-resolution image D01 may be used without performing the interpolation computation described above. For example, in the example shown in FIG. 3, the pixel values below may be used.

$$D30(x,y)=D01(x,y)$$

$$D30(x-1,y)=D01(x-1,y)$$

$$D30(x,y+1)=D01(x,y+1)$$

The image magnification device according to this embodiment may be used as a part of an image display apparatus. In particular, it may be used when the number of pixels in an image input to the image display apparatus is smaller than the number of the pixels of the display unit of the image display apparatus.

Second Embodiment

FIG. 8 illustrates a computing device for carrying out an image magnification method according to a second embodiment of the invention. The image magnification method according to the invention generates a high-resolution image D30 from a low-resolution image D01.

A computing device for carrying out the image magnification method according to the invention includes an input interface IF1, an output interface IF2, a processor CPU1, a program memory MEM1, and a data memory MEM2, and a data bus BUS1 that interconnects these components.

The processor CPU1 operates on a program stored in the program memory MEM1. Various data generated in the course of operations are stored in the data memory MEM2. The low-resolution image D01 is input to the computing device via the input interface IF1. The high-resolution image D30 generated by the image magnification method according to the invention is externally output via the output interface IF2.

FIG. 9 is a drawing illustrating the processing procedure in the image magnification method according to the invention. The image magnification method according to the invention includes an interpolation coefficient calculation step ST3A and an interpolation computation step ST3B; the method obtains the pixel values of individual pixels constituting the high-resolution image D30 by interpolation computations.

The interpolation coefficient calculation step ST3A will now be described.

Figure 10:
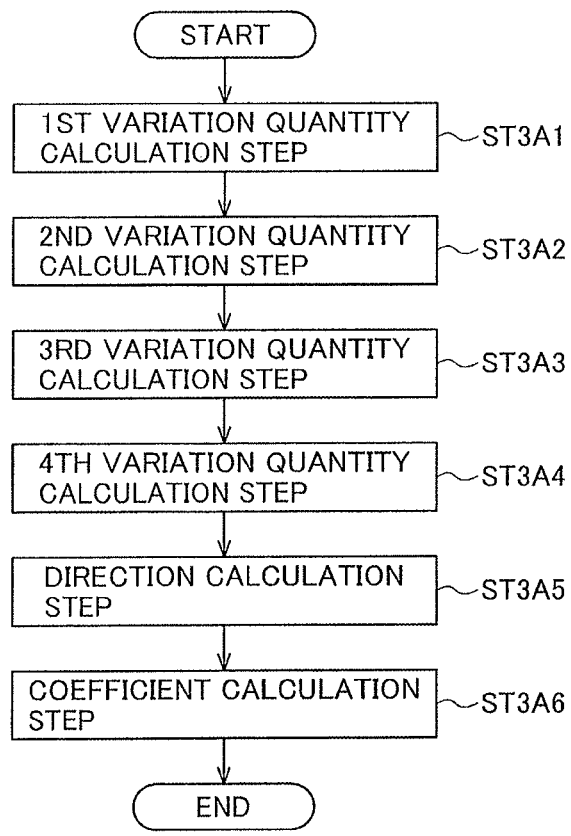
FIG. 10 is a flowchart showing the processing procedure in the interpolation coefficient calculation step ST3A in FIG. 9.

FIG. 10 is a drawing illustrating the processing procedure in the interpolation coefficient calculation step ST3A. The interpolation coefficient calculation step ST3A includes a first variation quantity calculation step ST3A1, a second variation quantity calculation step ST3A2, a third variation quantity calculation step ST3A3, a fourth variation quantity calculation step ST3A4, a direction calculation step ST3A5, and a coefficient calculation step ST3A6.

The first variation quantity calculation step ST3A1 calculates the first derivatives of the pixel values of the pixels in the low-resolution image D01 in the horizontal direction and obtains a first variation quantity D3A1 by the same process as in the first variation quantity calculation unit 3A1 described in the first embodiment.

The second variation quantity calculation step ST3A2 calculates the first derivatives of the pixel values of the pixels in the low-resolution image D01 in the vertical direction and obtains the second variation quantity D3A2 by the same process as in the second variation quantity calculation unit 3A2 described in the first embodiment.

The third variation quantity calculation step ST3A3 calculates the second derivatives of the pixel values of the pixels in the low-resolution image D01 in the horizontal direction and obtains the third variation quantity D3A3 by the same process as in the third variation quantity calculation unit 3A3 described in the first embodiment.

The fourth variation quantity calculation step ST3A4 calculates the second derivatives of the pixel values of the pixels in the low-resolution image D01 in the vertical direction and obtains the fourth variation quantity D3A4 by the same process as in the fourth variation quantity calculation unit 3A4 described in the first embodiment.

The direction calculation step ST3A5 will be described with reference to FIG. 11.

Figure 11:
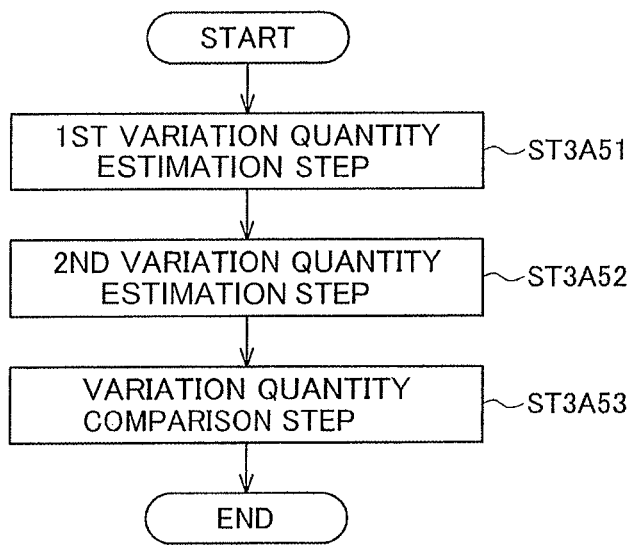
FIG. 11 is a flowchart showing the processing procedure in the direction calculation step ST3A5 in FIG. 10.

FIG. 11 is a drawing illustrating the processing procedure in the direction calculation step ST3A5. The direction calculation step ST3A5 includes a first variation quantity estimation step ST3A51, a second variation quantity estimation step ST3A52, and a variation quantity comparison step ST3A53.

The first variation quantity estimation step ST3A51 determines the first estimated variation quantity value D3A51 by the same process as in the first variation quantity estimation unit 3A51 described in the first embodiment.

The second variation quantity estimation step ST3A52 determines the second estimated variation quantity value D3A52 by the same process as in the second variation quantity estimation unit 3A52 described in the first embodiment.

The variation quantity comparison step ST3A53 will be described with reference to FIG. 12.

Figure 12:
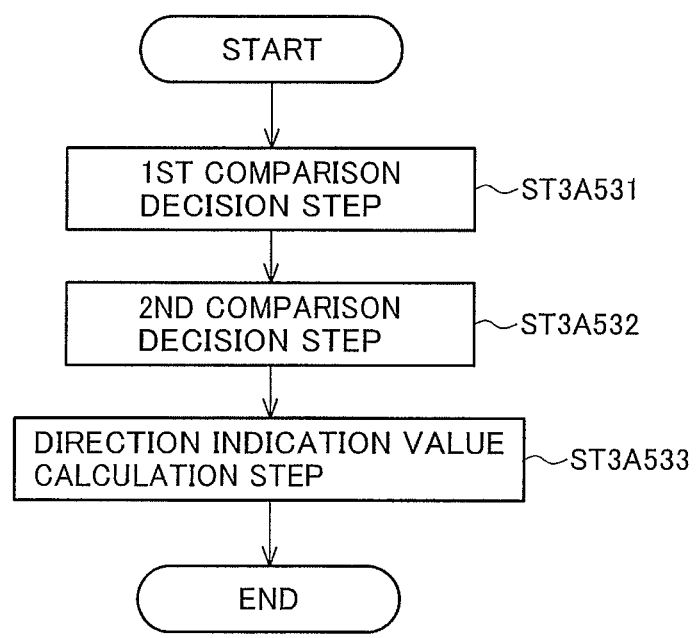
FIG. 12 is a flowchart showing the processing procedure in the variation quantity comparison step ST3A53 in FIG. 11.

FIG. 12 is a drawing illustrating the processing procedure in the variation quantity comparison step ST3A53. The variation quantity comparison step ST3A53 includes a first comparison decision step ST3A531, a second comparison decision step ST3A532, and a direction indication value calculation step ST3A533.

The first comparison decision step ST3A531 obtains a first comparison result D3A531 by the same process as in the first comparison decision unit 3A531 in the first embodiment.

The second comparison decision step ST3A532 obtains a second comparison result D3A532 consisting of a first count value D3A532N1 and a second count value D3A532N2 by the same process as in the second comparison decision unit 3A532 in the first embodiment.

The direction indication value calculation step ST3A533 obtains direction indication data D3A5 by the same process as in the direction indication value calculation unit 3A533 in the first embodiment.

The operation in the variation quantity comparison step ST3A53 is as described above, and is similar to the process used in the variation quantity comparison unit 3A53 described in the first embodiment.

The operation in the direction calculation step ST3A5 is as described above, and is similar to the process used in the direction calculation unit 3A5 described in the first embodiment.

The coefficient calculation step ST3A6 calculates interpolation coefficients D3A by the same process as in the coefficient calculation unit 3A6 described in the first embodiment.

The operation in the interpolation coefficient calculation step ST3A is as described above, and is similar to the process used in the interpolation coefficient calculation unit 3A described in the first embodiment.

The interpolation computation step ST3B will now be described.

The interpolation computation step ST3B obtains the pixel value of each pixel in the high-resolution image D30 by the same process as in the interpolation computation unit 3B described in the first embodiment.

The image magnification method according to the second embodiment of the invention operates as described above. The image magnification method of the invention can perform the same processing as the image magnification device in the first embodiment of the invention, so that it has the same effects as the image magnification device in the first embodiment of the invention. The variations of the image magnification device in the first embodiment of the invention are also applicable to the image magnification method according to the second embodiment of the invention.

An image magnification method according to this embodiment or a computing device that carries it out can be used as a part of an image display apparatus. In particular, they can be used when the number of pixels in an image input to the image display apparatus is less than the number of pixels of the display unit of the image display apparatus.

Reference Characters

3A: interpolation coefficient calculation unit; 3B: interpolation computation unit; D01: low-resolution image; D3A: interpolation coefficients; D30: high-resolution image.

What is claimed is:

1. An image magnification device for generating a high-resolution image from a low-resolution image, comprising:
   an interpolation computation unit that treats, as positions of interest, positions where pixels in the high-resolution image occupy when the high-resolution image is superimposed on the low-resolution image, and for each position of interest, obtains a pixel value for a pixel of interest assumed to be present at that position by performing an interpolation computation using pixel values of a plurality of pixels within the low-resolution image and interpolation coefficients for the plurality of pixels; and
   an interpolation coefficient calculation unit that obtains the interpolation coefficients by giving the interpolation coefficients values that increase with increasing strength of correlation of the pixels in the plurality of pixels in the low-resolution image with the pixel of interest, and outputs the interpolation coefficients to the interpolation computation unit; wherein
   the interpolation coefficient calculation unit includes
   a first variation quantity calculation unit for obtaining a first variation quantity in a first direction centered on each pixel in the low-resolution image,
   a second variation quantity calculation unit for obtaining a second variation quantity in a second direction centered on each pixel in the low-resolution image,
   a direction calculation unit for using a first interpolated variation quantity obtained by interpolation from the first variation quantity and a second interpolated variation quantity obtained by interpolation from the second variation quantity to obtain direction indication data indicating a direction of strong correlation, and
   a coefficient calculation unit for obtaining the correlation coefficients from the direction indication data.

2. The image magnification device of claim 1, wherein the interpolation coefficient calculation unit:
   processes pixels located in a direction of strong correlation as the strongly correlated pixels, and
   determines the direction of strong correlation from the low-resolution image.

3. The image magnification device of claim 1, wherein:
   the first variation quantity is obtained by taking a first derivative of the variation in pixel value in a first direction centered on each pixel in the low-resolution image; and
   the second variation quantity is obtained by taking a first derivative of the variation in pixel value in a second direction centered on each pixel in the low-resolution image.

4. The image magnification device of claim 3, wherein the interpolation coefficient calculation unit further includes
   a third variation quantity calculation unit for obtaining a third variation quantity in a third direction centered on each pixel in the low-resolution image, and
   a fourth variation quantity calculation unit for obtaining a fourth variation quantity in a fourth direction centered on each pixel in the low-resolution image, and wherein the direction calculation unit obtains the direction indication data based on the first to fourth variation quantities.

5. The image magnification device of claim 4, wherein:
   the third variation quantity is obtained by taking an absolute value of a second derivative of the variation in pixel value in a third direction centered on each pixel in the low-resolution image; and the fourth variation quantity is obtained by taking an absolute value of a second derivative of the variation in pixel value in a fourth direction centered on each pixel in the low-resolution image.

6. The image magnification device of claim 4, wherein:
the direction calculation unit determines the direction of strong correlation according to the third variation quantity and the fourth variation quantity if an absolute value of the first interpolated variation quantity is equal to or less than a first threshold value or an absolute value of the second interpolated variation quantity is equal to or less than a second threshold value.

7. The image magnification device of claim 6, wherein:
the direction calculation unit
makes determination on a basis of a result of a comparison between an absolute value of the third variation quantity and an absolute value of the fourth variation quantity for each pixel near the pixel of interest in the low-resolution image,
determines that there is a strong correlation in the third direction if there are more pixels for which the absolute value of the fourth variation quantity is greater than the absolute value of the third variation, and
determines that there is a strong correlation in the fourth direction if there are more pixels for which the absolute value of the third variation quantity is greater than the absolute value of the fourth variation.

8. The image magnification device of claim 6, wherein:
the direction calculation unit determines that there is no direction of strong correlation if a difference between the number of pixels for which an absolute value of the fourth variation quantity is greater than an absolute value of the third variation quantity and the number of pixels for which the absolute value of the third variation quantity is greater than the absolute value of the fourth variation quantity is less than a third threshold value, as a result of a comparison between the absolute value of the third variation quantity and the absolute value of the fourth variation quantity for each pixel near the pixel of interest in the low-resolution image.

9. The image magnification device of claim 1, wherein the coefficient calculation unit obtains the interpolation coefficients on a basis of distances between the pixels in the low-resolution image and the pixel of interest, as well as the direction indication data.

10. An image magnification method for generating a high-resolution image from a low-resolution image, comprising:
an interpolation computation step that treats, as positions of interest, positions where pixels in the high-resolution image occupy when the high-resolution image is superimposed on the low-resolution image, and for each position of interest, obtains a pixel value for a pixel of interest assumed to be present at that position by performing an interpolation computation using pixel values of a plurality of pixels within the low-resolution image and interpolation coefficients for the plurality of pixels; and
an interpolation coefficient calculation step that obtains the interpolation coefficients by giving the interpolation coefficients values that increase with increasing strength of correlation of the pixels in the plurality of pixels in the low-resolution image with the pixel of interest, and outputs the interpolation coefficients to the interpolation computation step; wherein
the interpolation coefficient calculation step includes
a first variation quantity calculation step for obtaining a first variation quantity in a first direction centered on each pixel in the low-resolution image,
a second variation quantity calculation step for obtaining a second variation quantity in a second direction centered on each pixel in the low-resolution image,
a direction calculation step for using a first interpolated variation quantity obtained by interpolation from the first variation quantity and a second interpolated variation quantity obtained by interpolation from the second variation quantity to obtain direction indication data indicating a direction of strong correlation, and
a coefficient calculation step for obtaining the correlation coefficients from the direction indication data.

* * * * *